United States Patent
Stephenson et al.

(10) Patent No.: US 8,296,342 B2
(45) Date of Patent: Oct. 23, 2012

(54) FINGERPRINTING A DATABASE

(75) Inventors: Bryan Stephenson, Alviso, CA (US); Ersin Uzun, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 12/551,402

(22) Filed: Aug. 31, 2009

(65) Prior Publication Data

US 2011/0055166 A1    Mar. 3, 2011

(51) Int. Cl.
*G06F 17/30* (2006.01)
*G06F 17/00* (2006.01)

(52) U.S. Cl. .............. 707/899; 705/51; 705/52; 705/53; 705/54; 705/55; 709/229; 382/305

(58) Field of Classification Search ................ 707/899; 705/51–59; 709/229; 382/305
See application file for complete search history.

(56) References Cited

U.S. PATENT DOCUMENTS

| | | | |
|---|---|---|---|
| 5,630,049 | A | 5/1997 | Cardoza et al. |
| 6,360,332 | B1 | 3/2002 | Weinberg et al. |
| 6,574,732 | B1 | 6/2003 | Steinberg et al. |
| 6,907,547 | B2 | 6/2005 | Shaw et al. |
| 7,110,984 | B1 * | 9/2006 | Spagna et al. ............... 705/57 |
| 7,149,722 | B1 * | 12/2006 | Abburi ............... 705/59 |
| 7,299,451 | B2 | 11/2007 | Dygon et al. |
| 8,023,773 | B2 * | 9/2011 | Brunk et al. ............... 382/305 |
| 2003/0131285 | A1 | 7/2003 | Beardsley et al. |
| 2004/0034696 | A1 | 2/2004 | Joffrain et al. |
| 2005/0204343 | A1 | 9/2005 | Kisamore et al. |
| 2007/0234293 | A1 | 10/2007 | Noller et al. |
| 2007/0240118 | A1 | 10/2007 | Keren |
| 2008/0098272 | A1 | 4/2008 | Fairbanks et al. |

OTHER PUBLICATIONS

R. Agrawal et al., "A System for Watermarking Relational Databases," SIGMOD 2003, Jun. 9-12, 2003, San Diego, California, Copyright 2003 ACM, 1 p.
R. Agrawal et al., "Watermarking Relational Databases," 12 p.
R. Agrawal et al., "Watermarking relational data: framework, algorithms and analysis," The VLDB Journal (2003) / Digital Object Identifier (DOI), Edited by P. Bernstein. Accepted: Dec. 10, 2002, 13 p.
C. Collberg et al., "Software Watermarking: Models and Dynamic Embeddings," 2 p. [Online] http://www.cs.arizona.edu/~collberg/Research/Publications/CollbergTh.
C. Collberg et al., "Dynamic Path-Based Software Watermarking," 10 p.
I. J. Cox et al., "Secure Spread Spectrum Watermarking for Multimedia," Published in IEEE Trans. on Image Processing, 6, 12, 1673-1687, (1997) Copyright IEEE, 31 p.
R. Sion et al., "Rights Protection for Relational Data and Sensor Streams," Cerias, Purdue University, 1 p.
S. Katzenbeisser et al., "Information Hiding Techniques for Steganography and Digital Watermarking," A Survey of Current Watermarking Techniques, Copyright 2000 Artech House Inc., 6 p.
M. Topkara et al., "Natural Language Watermarking," 12 p.
USPS, "Address Verification," United States Postal System, 3 p. [Online] http://www.usps.com/business/addressverification/welcome.htm.

(Continued)

Primary Examiner — Yicun Wu

(57) ABSTRACT

A method comprising fingerprinting, by the at least one processor, a first copy of a database with a fingerprint. The fingerprint has at least one part in common with another fingerprint used in another copy of the database, and at least one part unique to the first copy of the database. The fingerprinting comprises swapping attributes between multiple records in the first copy of the database.

12 Claims, 14 Drawing Sheets

OTHER PUBLICATIONS

Y. Zhang et al., "A Method of Protecting Relational Databases Copyright with Cloud Watermark," Proceedings of World Academy of Science, Engineering and Technology vol. 3 Jan. 2005, 5 p.

R. Sion et al., "Rights Protection for Relational Data," IEEE Transactions on Knowledge and Data Engineering, vol. 16, No. 12, Dec. 2004, 1509-1525, 17 p.

M. Topkara et al., "Natural Language Watermarking: Challenges in Building a Practical System," 12 p.

R. Venkatesan et al., "A Graph Theoretic Approach to Software Watermarking," Mar. 23, 2000, 9 p.

M. Atallah et al., "Natural Language Watermarking and Tamperproofing," F.A.P. Petitcolas (Ed): IH 2002, LNCS 2578, pp. 196-212, 2003, 17 p.

I. Cox et al., "Digital Watermarking," Book Reviews, 414 Journal of Electronic Imaging, Jul. 2002, vol. 11(3), 1 p.

K. Fukushima et al., "A Software Fingerprinting Scheme for Java Using Classfiles Obfuscation," WISA 2003, LNCS 2908, pp. 303-316, 2004, 14 p.

D. Gross-Amblard, "Query-preserving Watermarking of Relational Databases and XML Documents," PODS 2003, Jun. 9-12, 2003, pp. 191-201, 11 p.

F. Guo et al., "An Improved Algorithm to Watermark Numeric Relational Data," WISA 2005, LNCS 3786, pp. 138-149, 2006, 12 p.

M. Huang et al., "A New Watermark Mechanism for Relational Data," pp. 946-950, Copyright 2004 IEEE, 5 p.

N. Johnson et al., "Information Hiding: Steganography and Watermarking—Attacks and Countermeasures," Book Reviews, Journal of Electronic Imaging, Jul. 2001, vol. 10(3), 825, 2 p.

Y. Li et al., "Fingerprinting Relational Databases: Schemes and Specialties," IEEE Transactions on Dependable and Secure Computing, vol. 2, No. 1, Jan.-Mar. 2005, 12 p.

S. Liu et al., "A Block Oriented Fingerprinting Scheme in Relational Database," ICISC 2004, LNCS 3506, pp. 455-466, 2005, 12 p.

R. Sion, "Proving Ownership over Categorical Data," Proceedings of the 20th International Conference on Data Engineering (ICDE '04), 12 p.

* cited by examiner

| | NAME | AC | PH NUMBER | ADDRESS | EMAIL |
|---|---|---|---|---|---|
| 1 | | | | | |
| 2 | | | | | |
| 3 | | | | | |
| 4 | JOE SMITH | 555 | 246-1234 | 123 ELM ST. | JOE.SMITH@WORK1.COM |
| 5 | | | | | |
| 6 | AMY BAKER | 800 | 123-4567 | 567 MAIN ST. | AMY.BAKER@WORK.COM |
| 7 | | | | | |
| 8 | | | | | |
| 9 | | | | | |
| 10 | | | | | |

FIG. 2

| Record | Name | Area Code | Phone Number | Address | Email |
|---|---|---|---|---|---|
| 1 | Alan Smith | 202 | 234-5678 | 100 Main St. | Name1@work.com |
| 2 | Brad Smith | 303 | 345-6789 | 200 Elm St. | Name2@work.com |
| 3 | Chad Smith | 404 | 456-7890 | 300 Main St. | Name3@work.com |
| 4 | Dave Smith | 505 | 789-1234 | 400 Elm St. | Name4@work.com |
| 5 | Ed Smith | 606 | 678-1234 | 500 Main St. | Name5@work.com |
| 6 | Fred Smith | 707 | 567-1234 | 600 Elm St. | Name6@work.com |
| 7 | Greg Smith | 808 | 456-1234 | 700 Main St. | Name7@work.com |
| 8 | Hal Smith | 909 | 345-1234 | 800 Elm St. | Name8@work.com |
| 9 | Irving Smith | 212 | 234-1234 | 900 Main St. | Name9@work.com |
| 10 | Joe Smith | 313 | 234-1235 | 100 Elm St. | Name10@work.com |
| 11 | Leo Smith | 414 | 234-1236 | 200 Main St. | Name11@work.com |
| 12 | Moe Smith | 515 | 234-1237 | 300 Elm St. | Name12@work.com |
| 13 | Ned Smith | 616 | 234-1238 | 400 Main St. | Name13@work.com |
| 14 | Ole Smith | 717 | 234-1239 | 500 Elm St. | Name14@work.com |
| 15 | Pete Smith | 818 | 234-1240 | 600 Main St. | Name15@work.com |
| 16 | Quinn Smith | 919 | 234-1241 | 700 Elm St. | Name16@work.com |

Figure 10

| Record | Name | Area Code | Phone Number | Address | Email |
|---|---|---|---|---|---|
| 1 | Alan Smith | 505 | 234-5678 | 100 Main | Name1@work.com |
| 2 | Brad Smith | 303 | 345-6789 | 200 Elm St. | Name2@work.com |
| 3 | Chad Smith | 404 | 456-7890 | 300 Main | Name3@work.com |
| 4 | Dave Smith | 202 | 789-1234 | 400 Elm St. | Name4@work.com |
| 5 | Ed Smith | 606 | 678-1234 | 500 Main | Name5@work.com |
| 6 | Fred Smith | 212 | 567-1234 | 600 Elm St. | Name6@work.com |
| 7 | Greg Smith | 808 | 456-1234 | 700 Main | Name7@work.com |
| 8 | Hal Smith | 909 | 345-1234 | 800 Elm St. | Name8@work.com |
| 9 | Irv Smith | 707 | 234-1234 | 900 Main | Name9@work.com |
| 10 | Joe Smith | 919 | 234-1235 | 100 Elm St. | Name10@work.com |
| 11 | Leo Smith | 414 | 234-1236 | 200 Main | Name11@work.com |
| 12 | Moe Smith | 515 | 234-1237 | 300 Elm St. | Name12@work.com |
| 13 | Ned Smith | 616 | 234-1238 | 400 Main | Name13@work.com |
| 14 | Ole Smith | 717 | 234-1239 | 500 Elm St. | Name14@work.com |
| 15 | Pete Smith | 818 | 234-1240 | 600 Main | Name15@work.com |
| 16 | Quinn Smith | 313 | 234-1241 | 700 Elm St. | Name16@work.com |

Figure 12

| Record | Name | Area Code | Phone Number | Address | Email |
|---|---|---|---|---|---|
| 1 | Alan Smith | 606 | 234-5678 | 100 Main | Name1@work.com |
| 2 | Brad Smith | 303 | 345-6789 | 200 Elm St. | Name2@work.com |
| 3 | Chad Smith | 404 | 456-7890 | 300 Main | Name3@work.com |
| 4 | Dave Smith | 505 | 789-1234 | 400 Elm St. | Name4@work.com |
| 5 | Ed Smith | 202 | 678-1234 | 500 Main | Name5@work.com |
| 6 | Fred Smith | 808 | 567-1234 | 600 Elm St. | Name6@work.com |
| 7 | Greg Smith | 707 | 456-1234 | 700 Main | Name7@work.com |
| 8 | Hal Smith | 909 | 345-1234 | 800 Elm St. | Name8@work.com |
| 9 | Irv Smith | 212 | 234-1234 | 900 Main | Name9@work.com |
| 10 | Joe Smith | 919 | 234-1235 | 100 Elm St. | Name10@work.com |
| 11 | Leo Smith | 414 | 234-1236 | 200 Main | Name11@work.com |
| 12 | Moe Smith | 515 | 234-1237 | 300 Elm St. | Name12@work.com |
| 13 | Ned Smith | 616 | 234-1238 | 400 Main | Name13@work.com |
| 14 | Ole Smith | 717 | 234-1239 | 500 Elm St. | Name14@work.com |
| 15 | Pete Smith | 818 | 234-1240 | 600 Main | Name15@work.com |
| 16 | Quinn Smith | 313 | 234-1241 | 700 Elm St. | Name16@work.com |

Figure 13

FINGERPRINTING A DATABASE

BACKGROUND

Demanding market conditions are such that some companies outsource certain business processes and associated activities to third parties. Maintaining proper confidentiality of business-critical data is a significant concern for this approach. In many cases, third-party service providers need access to such information as the company's intellectual property, client/customer data, or other confidential information to carry out their services. However, a service provider may not be fully trusted or may not be securely administered. Furthermore, it can be difficult or nearly impossible to enforce confidentiality policies across different administrative domains. Some types of data (e.g., relational databases) are particularly easy to duplicate, and an unscrupulous service provider may have a financial incentive to redistribute commercially valuable data to unauthorized parties.

BRIEF DESCRIPTION OF THE DRAWINGS

For a detailed description of exemplary embodiments of the invention, reference will now be made to the accompanying drawings in which:

FIG. 2 illustrates swapping of attributes among records in accordance with various embodiments;

FIGS. 10-13 provide an example of the embodiment of FIGS. 6-9; and

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
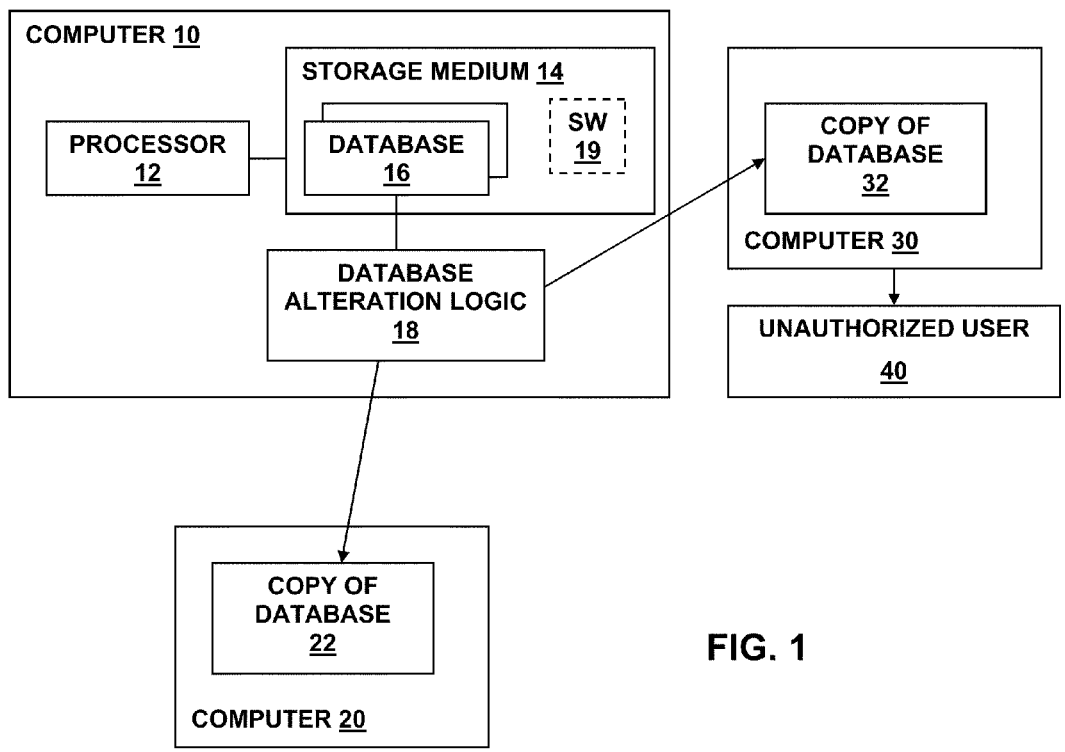
FIG. 1 shows a system in accordance with various embodiments.

FIG. 1 shows a system in accordance with various embodiments. The system comprises computers 10, 20, and 30 which may be implemented as servers or other types of computers. Computer 10 comprises a processor 12 coupled to a computer-readable storage medium 14. The storage medium 14 comprises volatile storage (e.g., random access memory), non-volatile storage (e.g., hard disk drive, read only memory, compact disc read only memory, Flash storage, etc.), or combinations thereof. The storage 14 may be contained within the computer 10. In other embodiments, the storage 14 is separate from, but accessible to, the computer 10 (e.g., a network-attached storage device).

The storage medium 14 contains one or more databases 16. Each database 16 may contain whatever information is desired for the database to contain. In accordance with one example, the database 16 is a relational database and includes a plurality of records and each record includes any one or more of various data fields such as name, address, telephone number, etc. In accordance with other examples, the database is a text file containing data. In accordance with yet other examples, the database is a spreadsheet file containing data. The disclosed technique is applicable to any structure of data which includes records or rows, where the records or rows contain attributes. The term "database" encompasses all such data structures.

The computer 10 on which the database 16 is stored is owned and/or operated by an entity such as an organization (e.g., a company) or an individual. The owner of the database 16 may desire to provide a copy of the database to one or more other entities such as for a marketing campaign. The owner of the database, however, does not want the recipient of the copy of the database to provide additional copies of the database to others. Embodiments of this disclosure provide a way to detect that a legitimate database recipient (i.e., someone or some organization to whom the owner gave a copy of the database) has leaked a copy of the database without permission from the owner. The database is "marked" in such a way that the unauthorized leak of the database can be detected and traced back to the source of the leak. The marking procedure described below can be performed by the database owner itself or by a service supplier to whom the owner transfers the database for marking. The computer 10 is described below as performing the marking, and computer 10 may belong to the database owner or to a supplier. In some embodiments, the database is marked in such a way that, to the extent multiple recipients received copies of the database, it can be determined which of the recipients leaked the database. That is, the leak can be traced back to a particular database recipient. In other embodiments, also described herein, the database is fingerprinted. A fingerprint precludes multiple recipients of the database from colluding to remove the marks placed to enable leak detection. Fingerprint marks apply to a subset of database recipients and generally cannot be detected by colluders.

Referring still to FIG. 1, the computer 10 comprises database alteration logic 18. Database alteration logic 18 may comprise hardware or software (e.g., software 19) executed by processor 12. As software, the database alteration logic 18 is stored on storage medium 14. The database alteration logic 18 alters the database 16 in such a way that an unauthorized leak of the database can be detected.

In accordance with at least some embodiments, the database alteration logic 18 alters the database 16 by permuting one or more attributes between two or more of the database's records in such a way that a predetermined property of the database changes. The permutation can be unique to each intended recipient of the database. Consequently, examining a database for that property indicates whether that database has been marked. Thus, if a copy of the database has been discovered and suspected to have been leaked, that copy can be analyzed for the predetermined property. If the property is found in the database, the leak can be traced back to a particular initial recipient as being a likely culprit to have leaked the database.

Permuting one or more attributes between records in a database changes the records and thus makes the records inaccurate. However, it is often the case that, for various reasons, such as human data entry error, one or more of the records in a database are erroneous anyway. The number of additional records to be intentionally altered in accordance with the various embodiments is generally a small percentage of the number of records that are already in error. For example, a database of 100,000 records might have 5000 records with errors. The technique described herein may result in an additional 250 (by way of example) records being marked (altered) thereby resulting in a relatively small increase in the total number of records with erroneous data. The increase in the number of records with errors may be considered to be a worthwhile tradeoff given the benefit provided by the disclosed marking technique—the ability to trace a leak of a database.

FIG. 2 shows an exemplary database of names, area codes, phone numbers, email addresses, and addresses. In the example database of FIG. 2, there are 10 records, numbered "1" through "10." In general, the database may have any number of records and each record may have any number and type of constituent elements. For purposes of this disclosure, the constituent elements of a record are referred to as "attributes." Each of the 10 records in the database of FIG. 2 has five attributes—name, area code, phone number, address, and email address. The example of FIG. 2 illustrates the attributes for two of the records. One record is for Joe Smith whose area code, phone number, address, and email address are 555, 246-1234, 123 Elm St., and Joe.Smith@work1.com, respectively. The other record is for Amy Baker whose attributes are area code 800, phone number 123-4567, address 567 Main St., and email address Amy.Baker@work.com.

In accordance with various embodiments, corresponding attributes between two or more records are swapped. For example, Joe Smith's area code may be swapped with Amy Baker's area code. The technique described below is used to determine which records to select for permutation of attributes in accordance with at least some embodiments.

The disclosed technique uses a keyed hash function. A hash function is a function that produces an output value based on an input value. A keyed hash function concatenates a key with the input data. A different key can be used for each database recipient. Further, there is little, if any, correlation between the input and output values and thus it is very difficult, if not impossible, to determine the hash function or the key based on an examination of the input and output values.

Figure 3:
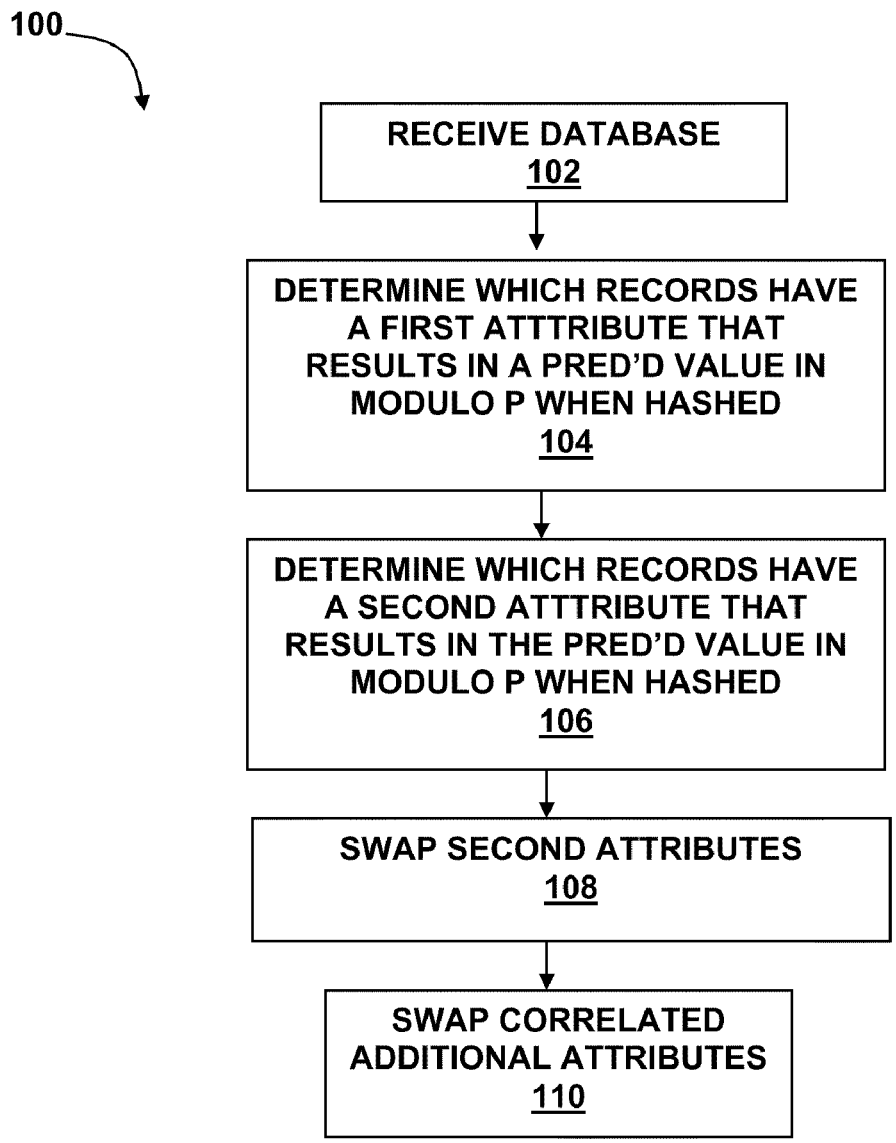
FIG. 3 shows a method of marking a database in accordance with various embodiments.

A marking method 100 in accordance with at least one embodiment for marking the database is illustrated in FIG. 3. The actions of the marking method 100 of FIG. 3 may be performed by the processor 12 of FIG. 1 executing software stored on the storage medium 14. The actions of FIG. 3 may be performed in the order shown, or in a different order, and some of the steps may be performed concurrently (i.e., in parallel).

At 102, the method comprises receiving a copy of a database to be marked. This step may be accomplished by the processor 12 retrieving a copy of the database from a storage medium, such as storage medium 14, or by downloading a copy of the database from another computer or storage device.

At 104, the method comprises determining which records have a first attribute that results in a predetermined value in modulo P when hashed with a key. This step comprises evaluating each record in the database. For each record, the key is concatenated with a first attribute and the result is hashed (input into a suitable hash function). The first attribute can be any of the attributes in the records. For step 104, the same attribute is hashed in each record. By way of an example, the first attribute may be the name attribute. In the example of FIG. 2, the name "Joe Smith" is concatenated with the key and hashed as well as the name "Amy Baker." The resulting value of hashing the key with the first attribute (name) is referred to as a "hash value." Step 104 comprises determining whether, for each record, the hash value in modulo P is a predetermined value. In some embodiments, the predetermined value is 0, but can be other than 0. Accordingly, for step 104, the first attribute in each record is hashed and then the resulting value of the hash is divided by P to determine the remainder. Step 104 determines if the remainder is a certain predetermined value (e.g., 0). This process is repeated for all records to identify those records whose first attribute has this property.

In general, there is a probability p that a first attribute for a given record will result in the predetermined value in modulo P when hashed. The relationship between p and P is p=1/P. For example, assume the modulo value P is 50. This means there is a 1/50 or 2% probability that a given record in the database will have its first attribute (e.g., name) result in the predetermined value 50 when hashed with a key.

Step 106 in the method of FIG. 3 is similar to step 104, but a different attribute is selected for hashing for each record. For example, the area code attribute may be selected as the second attribute. Accordingly, for each record in the database, the method determines whether the second attribute (e.g., area code) results in a predetermined value (e.g., 0) in modulo P when hashed using the same hash function. The predetermined value used in step 106 may be the same as or different than the predetermined value used in step 104. The probability is also p that a second attribute for a given record will result in the predetermined value in modulo P when hashed with a key.

The probability that a given record will have the property that both of its first and second attributes (e.g., name and area code) will result in a predetermined value in modulo P when hashed with a key is $1/(P^2)$ (also designated as $1/(P^{\wedge}2)$ where the ^ symbol means "raised to the power").

Referring still to FIG. 3, in step 108, second attributes are swapped between records in which, for one of the records, the first attribute results in the predetermined value used in step 104 in modulo P when hashed with a key and, for the other record, the second attribute results in the predetermined value used in step 106 in modulo P when hashed with a key. By swapping the second attributes between these records, at least one of the records will have first and second attributes that have the property that both attributes result in the predetermined value in modulo P when hashed with a key. As more and more records are permuted in this manner, the number of records in the altered database that will have both first and second attributes resulting in the predetermined value in modulo P when hashed with a key will increase. In accordance with various embodiments, most or all pairs of records (for which the properties of the first and second attributes between the record pairs are true) are permuted in this manner. In an unmarked database, the expected ratio is approximately $1/(P^2)$ for records with both the first and second attributes resulting in the predetermined value in modulo P compared to the total number of records in the database. In other words, the ratio of records with this property to the total number of records in the database is expected to be approximately $1/P^2$). For a marked database, however, the ratio of records with this property to the total number of records increases substantially to, for example, 1/P.

In general, there may be multiple records whose first attribute has the property described above and there will be multiple records whose second attribute has the property. A distance function is applied to help determine those records having the property for the first/second attributes for which the swap is to occur. In this context, a distance function is a function which determines how close two values are. In some embodiments, a distance function operates on the set of real numbers to determine which numbers are closest in value and thus be swapped. Such a distance function will help to minimize the error introduced by the permutation. For example, if the second attribute comprises temperature values, then temperatures closer in value should be chosen if possible. If three temperature values 70, 15, and 69 in three different records are candidates for permuting (swapping), the temperature values 70 and 69 should be swapped instead of 15.

The second attribute to be swapped among pairs of records may be somewhat correlated with yet a third attribute, or even more attributes. For example, email address and names are usually fairly well correlated. In the exemplary database of FIG. 2, Joe Smith's email address (joe.smith@work1.com) bears some relationship to his name, Joe Smith. If the second attribute is the email address and Joe and Amy's email addresses were swapped, then Joe Smith's record would have Amy Baker's email address and vice versa. Permuting records in this manner may be detectable by an unauthorized person trying to figure out the permutations, for example, to swap the attributes back to their original form to remove the mark. Instead of just swapping the email addresses, the name attributes may also be swapped. In general, some embodiments include swapping the second attribute and any other attribute that is considered somewhat correlated to the second attribute. Some embodiments attempt to choose an attribute with few or no correlations to other attributes.

As noted above, more than one copy of a database may be given to multiple recipients. In accordance with various embodiments, each such database copy is marked as described above, but using a different key as the additional input to the hash function. The different key will (almost always) result in a different set of records with first and second attributes resulting in the same predetermined value (e.g., 0) in modulo P when hashed with that key using the same hash function. Computer 10 stores information which specifies which key was used to mark a database copy given to a particular recipient, to trace which recipient may have leaked a copy of a marked database.

After marking the copies of the database in this manner, the database copies are distributed to recipients such as to computers 20 or 30. Without permission of the database owner, one or more of the recipients may further distribute (e.g., sell) their copy of the database to an unauthorized third party(ies). If the database owner discovers a partial or complete copy of the database on, for example, a network, and suspects that copy to have been improperly distributed, a computer owned or operated by the database owner or someone else can analyze the database copy to determine if it had been marked, and if so, which recipient's mark is contained in the leaked copy.

Figure 4:
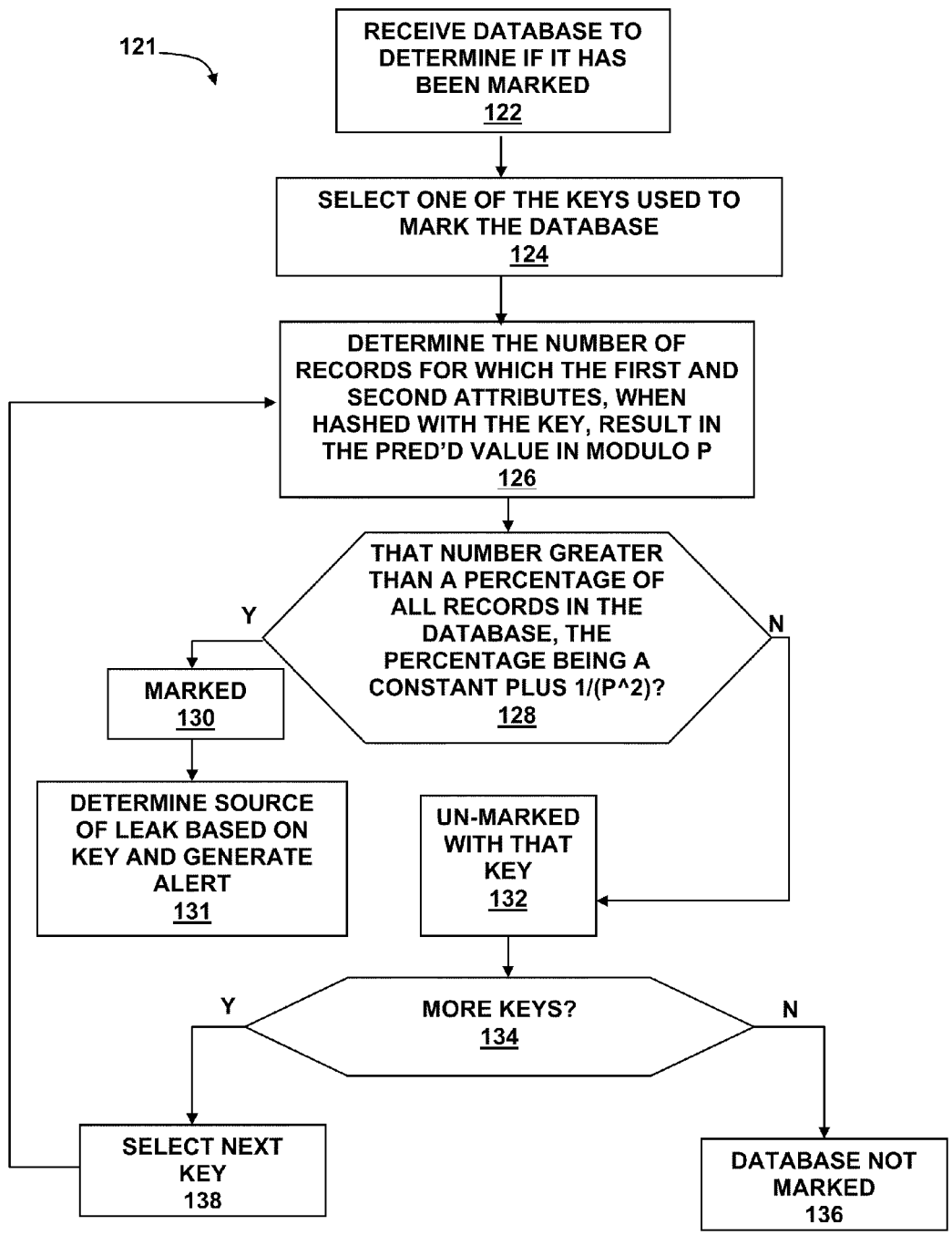
FIG. 4 shows a method of determining whether a database has been marked in accordance with various embodiments.

FIG. 4 illustrates a method 121 for analyzing a copy of a database to determine if the copy is marked in accordance with the technique noted above. This method 121 may be performed by, for example, processor 12 of computer 10 executing software stored in storage medium 14. A copy of the suspect database copy is received at 122 (e.g., downloading or retrieval from storage).

As multiple copies of the database may have been marked, the method 121 comprises selecting one of the keys that were used to mark a copy of the database in the first place. The software that performs the detection algorithm is aware of which keys were used during the marking phase of each database copy. At 126, the method comprises determining the number of records in the copy of the database being analyzed for which the first and second attributes both result in the predetermined value (e.g., 0) in modulo P when hashed with the key. It is to be expected that, for an unmarked database, this number will be approximately $1/(P^2)$ of the total records in the database. If, however, that number is significantly higher (e.g., 1/P of the total records), then it is determined that the database has been marked using the same key. Decision step 128 determines whether the number of records with the property noted above for both first and second attributes is greater than a certain percentage of the records in the database. In some embodiments, that particular percentage is a constant value plus $1/(P^2)$. Lower values may still be indicative of marked databases. The constant value can be preset or programmed. The result of decision 128 is that the database is determined to have been marked (130) or not to have been marked (132) with that particular key. If the percentage of records with the target property is not greater than the constant value plus $1/(P^2)$, then the database is determined not to have been marked using that particular key.

If the database is determined to have been marked, then it is known which key was used to mark the database, and that information then can be used to trace the leak to the particular recipient (step 131). An alert can then be generated by the computer. The alert may comprise a message being sent to a person, a visual alert, an audible alert, etc. If the database is not determined to have been marked based on the particular key selected in step 124, then, if other keys were used during the marking phase (decision step 134), another key is selected at 138 and the process repeats. The process will repeat for additional keys until a key is discovered to have been the key used to mark the database copy at hand, or no more keys were used to mark the database. In this latter situation, the method determines at 136 that the database copy has not been marked at all, and thus none of the recipients likely leaked the database copy.

If two recipients (e.g., people, computers) receive a copy of the database uniquely marked as described above, it might be possible for such recipients to compare their copies to identify those records that are identical between the copies and those records that are different. Further, such records that are different between the copies of the database (presumably those records that have been uniquely marked for each such recipient) can be removed by the colluders thereby removing the marks and avoiding the leak detection mechanism the marks otherwise would have provided.

Fingerprinting copies of a database marks the copies of the database in such a way that collusion between multiple recipients of the copies of the database can be determined. Each copy of the database is fingerprinted for collusion detection to detect leaks. Such fingerprints are generally undetectable by the recipients receiving the copies of the database. Moreover, even if such recipients collude to remove one or more of the marked records, some of the marked records will remain in the copies of the database because such marks exist in each colluder's copy of the database (i.e., marks common to the colluders' copies) and thus cannot be detected by comparing the different copies. The fingerprinting process changes (marks) records in such a way that some of the changed (marked) records are common to each set (two or more) of database recipients. Thus, while colluders can interact to identify and remove some of the marks that indicate a leak, the marked record(s) that remains identifies which recipients colluded together to identify and remove the marks.

Two copies of the database, to be given to two recipients, will have a different fingerprint code placed in their copy of the database. The recipients colluding to detect marked records will not be able to identify all of the marked records, only some of them. If it is desired to be able to detect any pair of colluding recipients, then fingerprint codes which have this capability need to be selected; such codes would cause some marks to be placed in common for any pair of recipients. If it is desired to detect three colluding recipients, then the size of the fingerprint code increases; the codes would cause some common marks to be placed in the copies sent to every set of three recipients. In general, the number of recipients and the number of colluders that is desired to be able to detect determines the length of the fingerprinting code needed.

In accordance with various embodiments, a fingerprint code comprises a multibit code, whose length depends on the number of recipients and the number of colluders that one desires to be able to detect. Each copy of a database is fingerprinted with a different code (also referred to herein as a codeword). At least one of the corresponding bits between a pair of codewords is the same, and some or all of the other bits are different. For example, two codewords might be "011" and "101". The third bit in each code word is the same and the first two bits are different.

The codewords are used in the fingerprinting techniques described below. The bits that are different ensure that different yet predictable marks are placed in the database copies, and the common bit from the codewords ensures that some of the marks are identical among particular sets of database recipients, thereby detecting collusion among those recipients. Colluders might be able to detect the different marks resulting from the different bits in the codewords, but not the common marks resulting from the same bit(s) in the codewords.

The following explanation describes two embodiments to implement a fingerprinting method. The first such embodiment uses the marking algorithm described above (method 100 in FIG. 3), and will now be described with reference to FIG. 5.

Figure 5:
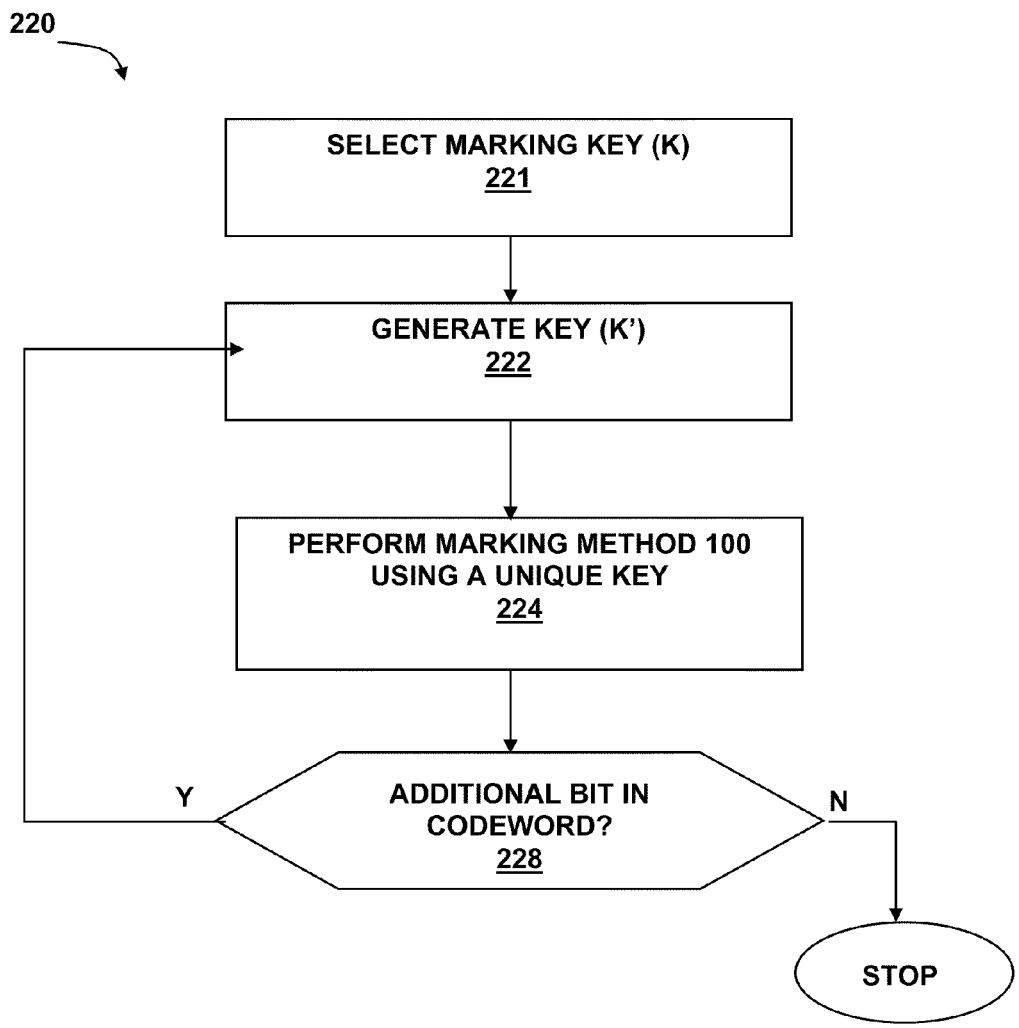
FIG. 5 shows one implementation of a fingerprinting technique in accordance with various embodiments.

FIG. 5 provides a method 220 which can be performed by, for example, database alteration logic 18 of computer 10. Method 220 is performed for each copy of a database to be given to a particular recipient, and for each recipient is performed multiple times—once for each bit in the relevant codeword.

At 221, the method comprises selecting or retrieving a marking key K which will be used to fingerprint all copies of this database for all recipients. At 222, the method comprises obtaining (e.g., generating, reading, etc.) a key K' (different than the key used in 221) which will be used in this iteration to embed one bit of the codeword. The key obtained at 222 can be obtained in accordance with various techniques. One such technique is to concatenate the marking key with the number of the bit from the relevant codeword and with the value of the bit from the relevant code word. In a 3-bit code word, the number of the bit is 1, 2, or 3, and the value of the bit either is a 0 or a 1. The marking key is used throughout this process and can be a random or other suitable number.

Once the key K' is obtained, at 224 the method comprises performing the marking method 100 of FIG. 3 using the key, which embeds one bit of the codeword and the value of that bit (0 or 1) of the codeword into the database. At 228, the method determines whether any more bits of the codeword remain. If a bit of the codeword remains to be used, then control loops back to 222 and another key is generated. The same marking key is used, but is concatenated with a different bit number and possibly a different bit value. For a 3-bit code word, the process loop of FIG. 5 is iterated three times. Once all codeword bits have been exhausted, the process stops.

The process described above in FIG. 5 marks a copy of a database using the codeword (also referred to as placing or embedding the codeword in the database copy) in a predictable, repeatable manner. Further, the codewords are selected such that some of the marks (attribute swappings) are the same between pairs or larger sets of database copies and other marks are different.

Using the keys that were used to uniquely mark the database copy for each recipient permits a leak to be detected as explained above. If, however, colluders have been successful at removing some of the marks (e.g., looking for and deleting all records that are different between multiple copies of the database), such collusion activity will not likely be successful in removing the fingerprint marks that are common to a set of recipients to which a copy of the database was provided. Accordingly, performing the detection method 121 of FIG. 4 will detect which bits of the codewords are embedded in the database.

Detection of a database that has been fingerprinted as described above can be determined using the detection method 121 of FIG. 4. The detection method 121 of FIG. 4 may be performed using the same keys used in the fingerprinting method 220 of FIG. 5, that is, the keys generated based upon the codewords unique to each entity that received a copy of the database. Thus, at 124 in method 121 in which a key is selected, the selected key is one of the keys that embedded one bit of the codeword into the database for a given recipient. Finding the key in the database indicates that a bit of the codeword has been detected in this database copy. The detection method 121 is performed multiple times, each time with a different such key, to find all the bits of the codeword which are detectable in this database copy.

For each set of keys used to place a set of fingerprint codes in database copies, various embodiments comprise performing detection method 121 for each key in that set of keys. The detection of a mark based on a given key from the set of keys indicates a bit of the codeword has been found. Each bit of the codeword is likely to be found several times. The detection process comprises counting the number of times each bit of each codeword is found in a given database copy. These counts are used to make the determination of who leaked and who colluded. For example, if all bits of the codeword for recipient A are found between 23 and 27 times, and all bits of other codewords less than 5 times, then it is statistically likely that recipient A leaked this copy. Continuing the example, if all bits of the codeword common to recipient A and recipient B are found, a relatively large number of times (e.g., 23 to 27 times) and all other bits of all other codewords a relatively small number of times (e.g., less than 5) then it is statistically likely that recipient A and recipient B colluded to remove the marks which their database copies had in common (because those bits of the codeword are gone) and leaked this copy. The marks placed (and remaining) due to the bits of the codeword which were common between recipient A's codeword and recipient B's codeword indicate that these two parties colluded to remove the marked records which they could identify by comparing their copies of the database.

As explained above, the fingerprint method can be implemented with at least the two embodiments described herein. The method 220 of FIG. 5 was one such embodiment. FIGS. 6-9 illustrate another embodiment of an implementation of method 200.

Figure 6:
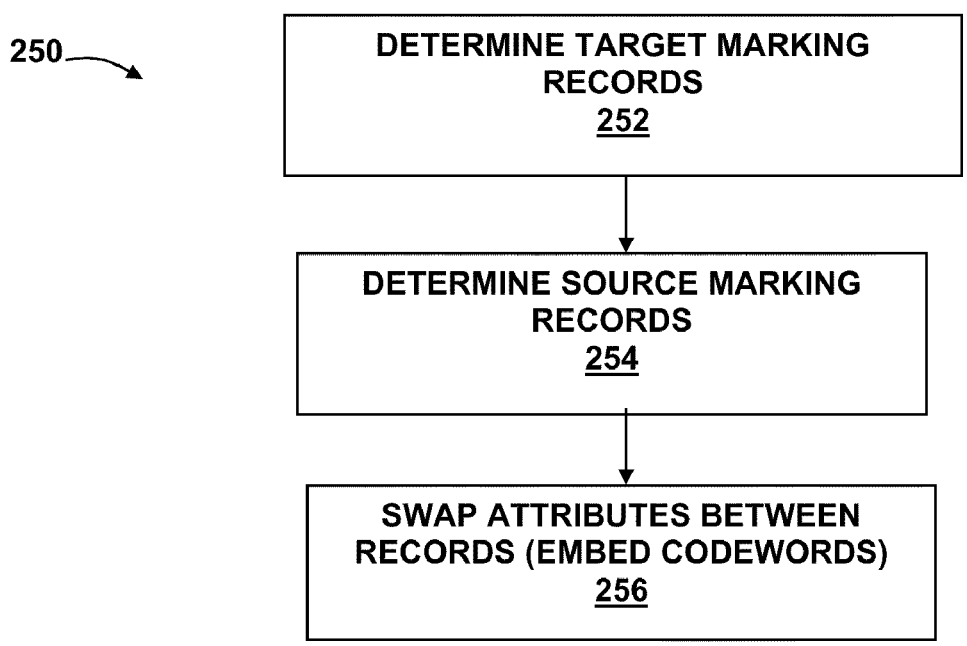
FIGS. 6-9 show another implementation of a fingerprinting technique in accordance with various embodiments.

FIG. 6 shows a method 250 which also can be implemented by database alteration logic 18 (FIG. 1). At 252, the method comprises determining which records in a given copy of a database to be fingerprinted for a given recipient comprise "target marking records." Such target marking records are records that have an attribute that is to be swapped with another record in the database. At 254, the method comprises determining which records in the copy of the database comprise "source marking records." Such source marking records comprise a set of records from which a record is chosen to engage in an attribute swap with a target marking record. At 256, the method 250 comprises swapping attributes between target and source marking records.

In this embodiment, each recipient to which a fingerprinted copy of the database is to be provided is assigned a codeword. In accordance with at least some embodiments, each codeword is a binary value having a length of L bits. As explained above, the length L of the codeword depends on how many recipients there are and how many colluding recipients you wish to detect. The more recipients, the longer the codeword. The larger the number of colluding recipients that you wish to detect, the larger the codeword.

Figure 7:
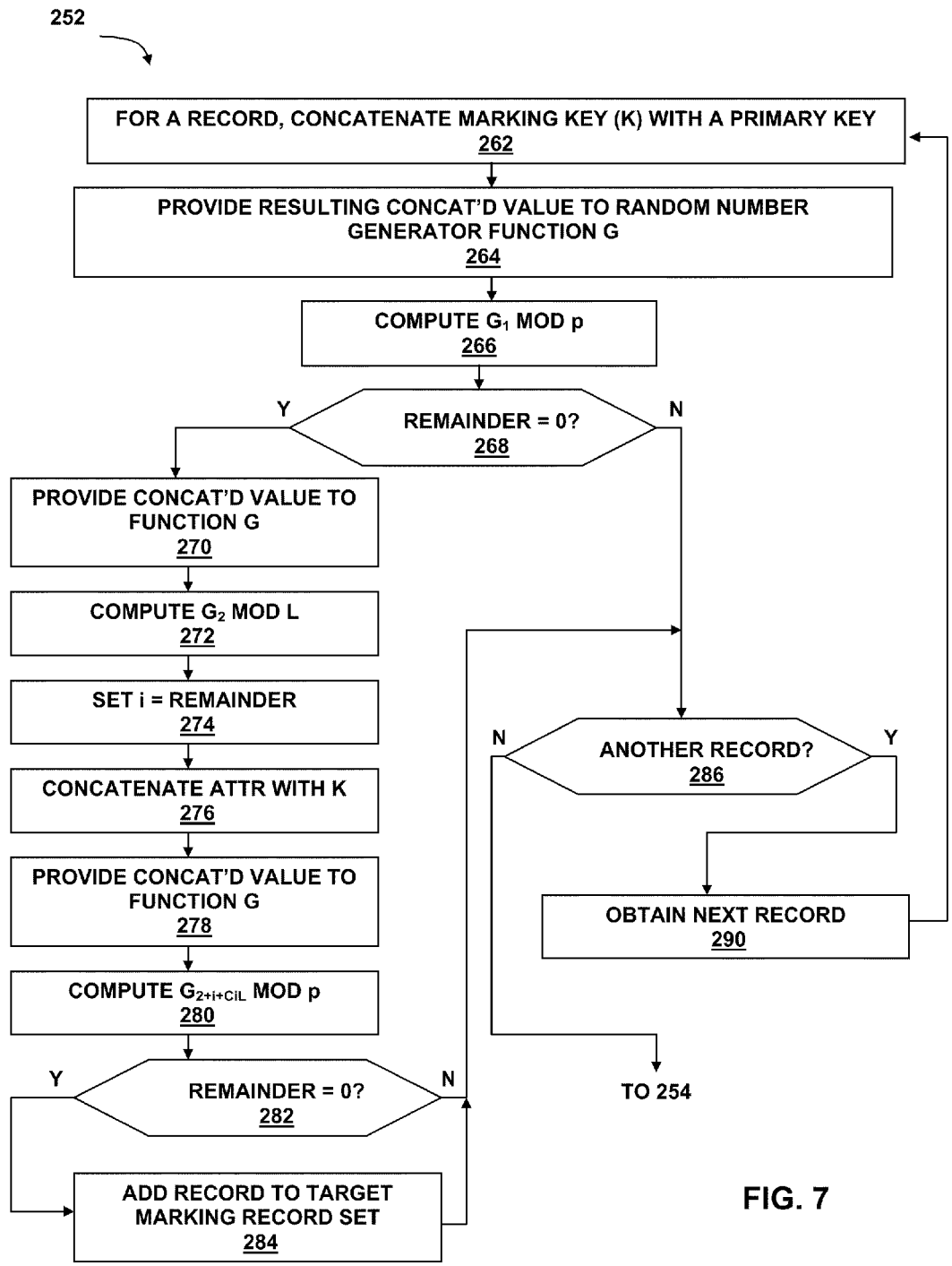

FIG. 7 shows an illustrative embodiment of action 252 from FIG. 6. At 262, for each record in a copy of the database to be marked, a marking key (K) is concatenated with a primary key. The marking key K comprises, for example, a random or pseudo-random number. The primary key may be one of the attributes of the records (e.g., NAME, FIG. 2). The resulting concatenated value is provided at 264 as an input to a function G that generates a series of random or pseudo-random numbers which are determined by the input value. The first value output by function G is referred to as $G_1$, the second value as $G_2$, and so on. The output value $G_1$ is used in the computation at 266 in which the method computes $G_1$ mod p, the remainder of which analyzed at 268.

At 268, if it is determined that the remainder is not zero, then the method continues at 290 in which the next record is selected and the method loops back to 262 and repeats. If, however, the remainder is determined to be zero, the control passes to 270 in which the same concatenated value is again provided to function G. At 272, the output value $G_2$ is used in the computation $G_2$ mod L (L is the length in bits of the codeword for the entity whose database copy is being fingerprinted).

At 274, the method comprises setting a value i equal to the remainder from mod calculation of 272. The value i thus will be an integer in the range of 0 to L−1. For example, if L is 3, then i will be 0, 1, or 2. The value i is used, at least in part, as an index to a particular bit of the codeword. In some embodiments, 1 is added to i to rescale the value i to the range of 1 to L.

At 276, the method comprises concatenating the attribute being considered for swapping (e.g., area code) with the marking key K. The resulting concatenated value is provided as an input to the function G (278). At 280, the following function is computed:

$$G_{2+i+C_iL} \pmod p$$

$C_i$ is the value (0 or 1) of the $i^{th}$ bit of the codeword.

At 282, the method determines whether the resulting remainder is zero. If the remainder is zero, then control passes to 286 at which it is determined whether there are any more records in the database to be analyzed. If the remainder is not zero, then the particular record being analyzed is added to a target marking list as a record to be altered (e.g., have an attribute swapped with a corresponding attribute of another record). Upon adding the record to the target marking set, control passes to 286 at which it is determined whether there are any more records in the database to be analyzed.

Figure 8:
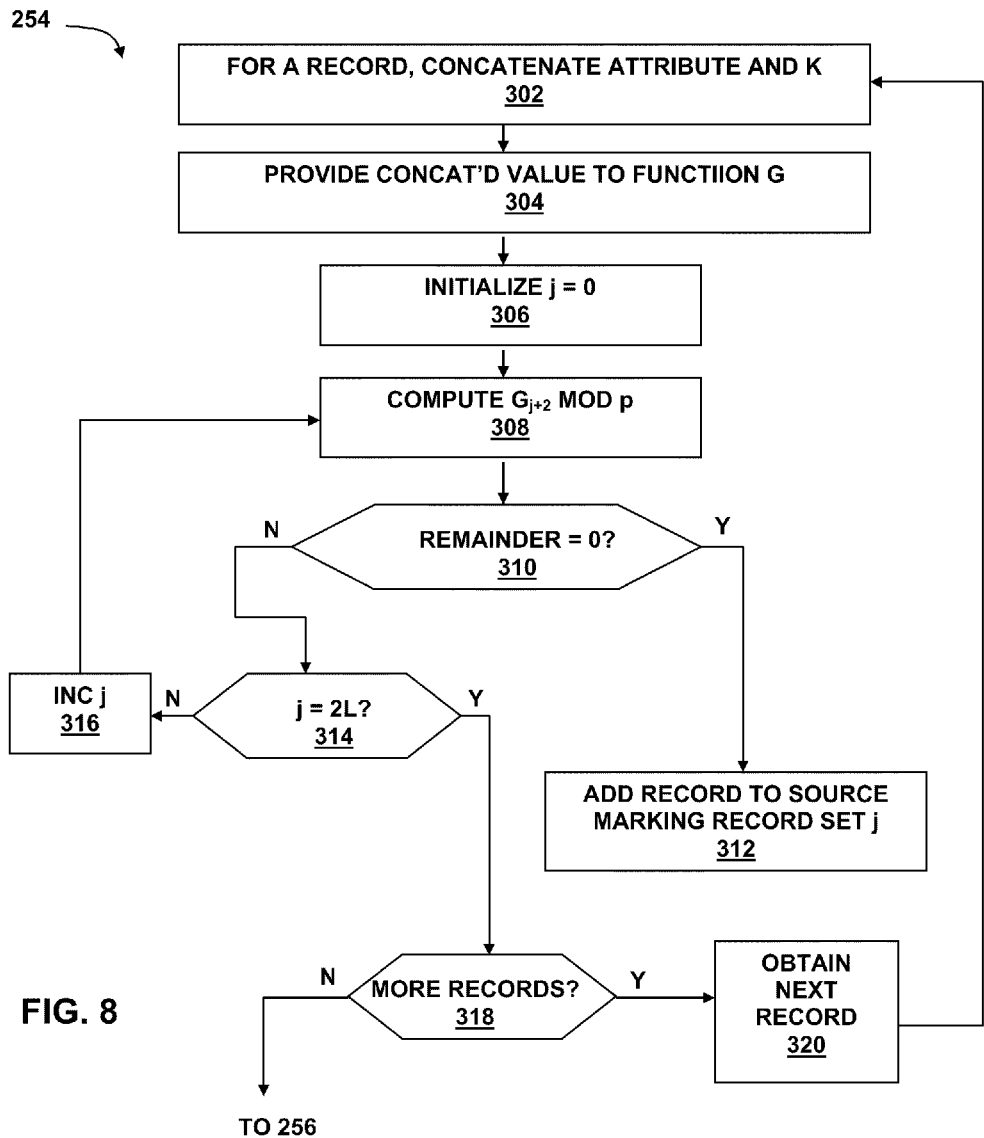

Once all records in the copy of the database have been analyzed, for example, per the embodiment of FIG. 7, then a set of records has been assembled as target marking records, that is, records whose attributes are to be swapped with selected records from a source marking set. The records determined for inclusion in the selected source marking set are determined by action 254 in FIG. 6. FIG. 8 illustrates an embodiment of action 254.

FIG. 8 shows an iterative process for determining which records to include the source marking set. For each iteration, at 302 an attribute to potentially be swapped is concatenated with the marking key K. At 304, the concatenated value is provided to the function G. At 306, a variable j is initialized to zero. At 308, $G_{j+2}$ mod p is computed.

If at 310 the remainder is not equal to zero, then the method determines at 314 whether j is equal to 2*L. If j is not equal to 2*L, then j is incremented at 316 and control loops back to 308. If, at 314, j does equal 2*L, then at 318, the method determines whether any more records are present in the database to be analyzed. If no more records are present, control passes to 256 in FIG. 8; else the next record is chosen at 320 and control loops back to 302.

At 310, if the resulting remainder is zero, the record is added to a source marking record set. The particular source marking record set to which the record is added is the j'th set. Control then continues at 314.

Figure 9:
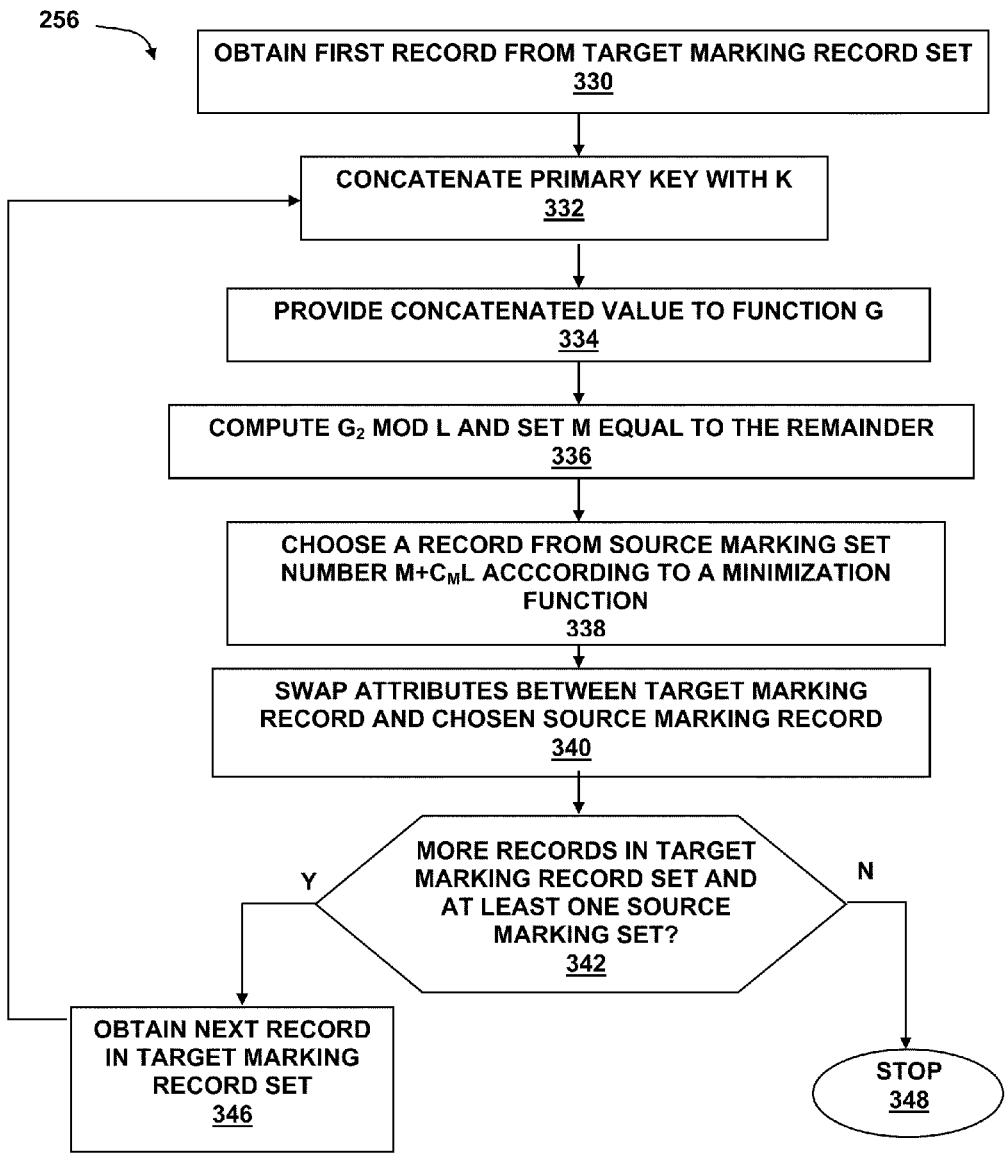

In the embodiment of FIG. 9, for each record in the database, 2*L iterations of 308, 310, 312, 314, and 316 are performed to determine records to be included in the source marking record sets.

FIG. 9 provides an illustrative embodiment of the attribute swapping action 256 of FIG. 6. At this point, the target and source marking record sets have been formed. At 330, the first record from the target marking record set is obtained (e.g., read). At 332, the method comprises for that record in the target marking record set, concatenating the primary key with the marking key K. At 334, the method comprises providing the concatenated value to the function G. At 336, $G_2$ mod L is computed and a variable m is set equal to the resulting remainder.

At 338, the method comprises choosing a record from the $m+C_mL$ source marking record set according to a minimization function, such as a distance function as described above. At 340, the attributes between the record from the target marking record set and the record chosen from the source marking record set are swapped. At 342, the method determines whether any more records are present in both the target marking record set and at least one of the source marking sets to be altered. If one or more records are present, then the next record is obtained at 346, and control loops back to 332 where the process repeats. If no more records are present, then the method stops at 348.

The following provides an example relating to the method of FIGS. 6-9. For purposes of this example, assume that there are two collusion-resistant fingerprinting codes to be embedded in two copies of the database given to two entities. Entity A is assigned fingerprint codeword 011 (binary). Entity B is assigned fingerprint codeword 101 (binary). FIG. 10 shows an illustrative subset of the database records.

As explained above, a number of records are selected in which to swap attributes. Each attribute swap corresponds to a bit of the fingerprint codeword. By swapping attributes, a fingerprint codeword is written into (i.e., embedded in) the copy of the database. The value L is the length of the fingerprint codeword. In this example, each codeword is 3 bits, so L has the value 3.

Figure 11:

Action 252 of FIG. 6 is performed. An embodiment of action 252 is provided in FIG. 7. As a result of that part of the method, various records are identified and included in the target marking record set. FIG. 11 illustrates three records 352 that have been added to the target marking record set.

After performing action 254 in FIG. 6 (additional detail shown in FIG. 9), the various source marking record sets are determined as well. In the present example, each set of source marking records contains a single record. The source marking records in the present example are records 4, 5, 7, 9, 13, and 16, and represent source marking record set numbers 1, 4, 2, 5, 3, and 6 of source marking records, respectively. In general, multiple source marking records comprise each source marking record set. The dashed arrows in FIG. 12 point between a record from the target marking record set (records 1, 6, and 9) and a record from the source marking record sets (records 4, 5, 7, 9, 13, and 16). The dashed arrows illustrate the potential attribute swaps that may occur.

The fingerprinting codeword is embedded into the database by swapping some of the pairs of attributes as explained above at action 256 (FIG. 6) and additional detail in FIG. 9, with the potential attribute swaps identified in this example with the dashed arrows of FIG. 11.

Continuing the present example, FIG. 12 shows the original data with the actual attribute swaps indicated by solid arrows to introduce the fingerprint codeword 011 for entity A. The area code attribute of record 1 has been swapped with that of record 4 to indicate the first bit of the codeword has value 0. The area code attribute of record 6 has been swapped with that of record 9 to indicate the second bit of the codeword has value 1. The area code attribute of record 10 has been swapped with that of record 16 to indicate the third bit of the codeword has value 1.

Similarly, FIG. 13 shows the original data with the actual attribute swaps indicated by solid arrows to introduce the fingerprint codeword 101 for entity B. The area code attribute of record 1 has been swapped with record 5 to indicate the first bit of the codeword has value 1. The area code attribute of record 6 has been swapped with record 7 to indicate the second bit of the codeword has value 0. The area code attribute of record 10 has been swapped with record 16 to indicate the third bit of the codeword has value 1.

Figure 14:
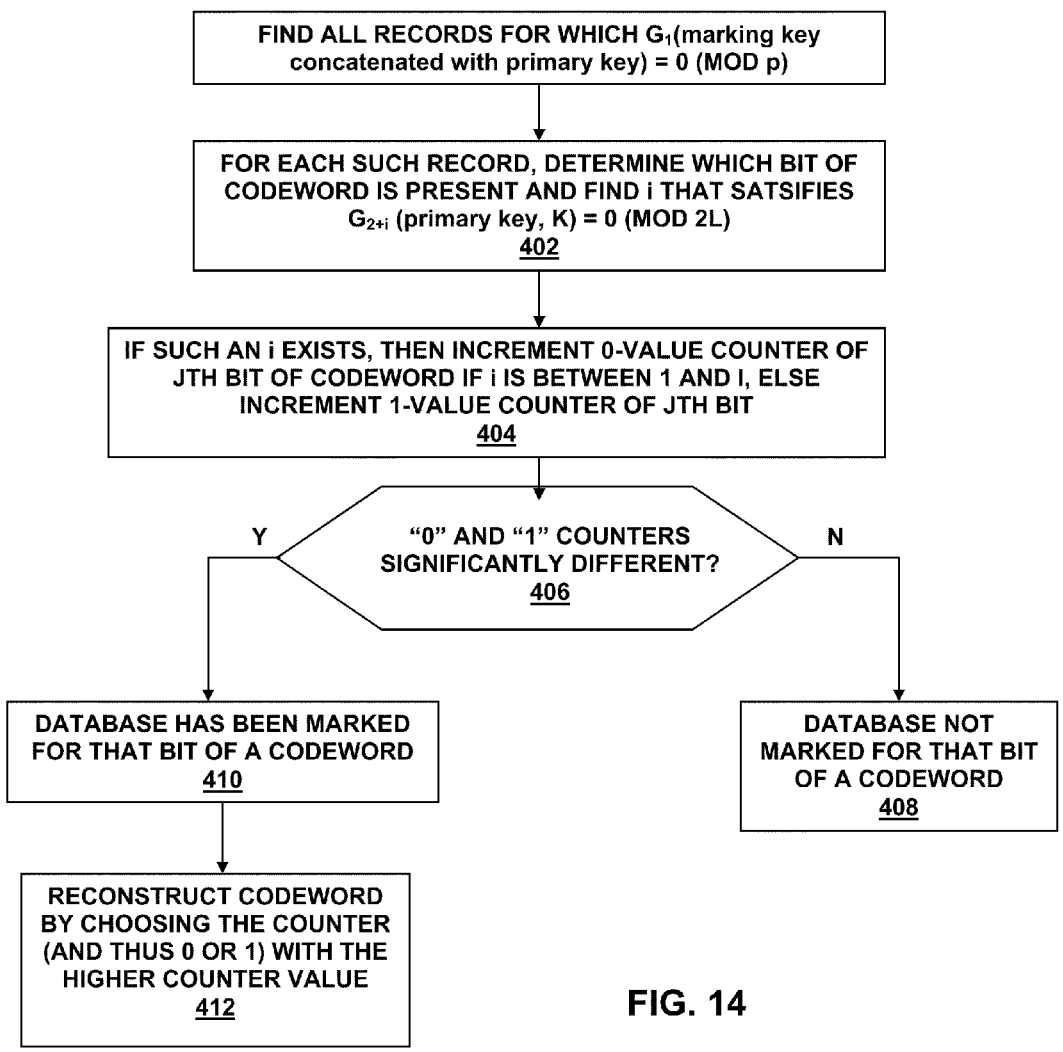
FIG. 14 provides an example of a detection process associated with the fingerprinting technique of FIGS. 6-9.

Detection of a fingerprinted copy of a database per the method of FIGS. 6-9 is illustrated in the example of FIG. 14. The method shown in FIG. 14 comprises finding (at 400) all records for which $G_1$ (marking key concatenated with primary key) is 0 (mod p). For each such record, the method comprises at 402 determining which bit of the codeword is present and finding the value i that satisfies the expression $G_{2+i}$(primary key, K)=0 (mod 2L). At 404, if such an i exists, then a 0-value counter is incremented for the jth bit of the codeword if i is between 1 and L, else a 1-value counter is incremented for the jth bit of the codeword.

At 406, after processing all of the records, a comparison of the two counters for each bit of the codeword is made. If the two counters are not significantly different (e.g., within a predetermined percentage of each other), then it is determined that the database does not contain a mark for that bit of any codeword (408). Otherwise, the database is determined to contain a mark for that bit of the codeword (410), and at 412, the codeword (or a part of the codeword) is reconstructed by choosing the counter (and thus a 0 or a 1) with the higher count value for each bit of the codeword which has significantly different counter values.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   fingerprinting, by at least one processor, a first copy of a database with a first fingerprint having at least one part of said first fingerprint in common with another fingerprint used for another copy of said database, and at least one part of said first fingerprint unique to said first copy of said database;
   wherein said fingerprinting said first copy of said database comprises swapping attributes between multiple records in said first copy of said database; and
   an operation selected from the group consisting of a first operation and a second operation;
   wherein said first operation comprises identifying a first record in said first copy that has a first attribute that results in a predetermined value in modulo P when hashed with a key and a second record in said first copy that has a second attribute that also results in said predetermined value in modulo P when hashed with a key, and wherein swapping said attributes comprises swapping said second attributes between said first and second records; and
   wherein said second operation comprises determining target marking records whose attributes are to be swapped and determining source marking records having attributes potentially to be used to swap with said attributes of said target marking records, wherein determining said target marking records comprises, for a given record in said first copy of said database, concatenating a marking key with a primary key to produce a concatenation.

2. The method of claim 1 further comprising, if said operation of the group is said first operation, detecting said first fingerprint in said first copy of said database by determining a number of records for which first and second attributes, when hashed with a key, result in said predetermined value in modulo P.

3. The method of claim 1 wherein, if said operation of the group is said second operation, determining said target marking records further comprises providing said concatenation to a random number generator and computing a random number modulo a predetermined number.

4. The method of claim 3 wherein said predetermined number comprises a length of a codeword, said codeword being unique to said first copy of said database.

5. The method of claim 3 wherein determining said target marking records further comprises that when a remainder of a modulo computation is zero, adding said given record to a target marking record list.

6. The method of claim 3 wherein if a remainder of a modulo computation is not zero, precluding said given record from being added to a target marking record list.

7. A computer-readable storage medium (CRSM) comprising software that, when executed by at least one processor, causes said at least one processor:
   to fingerprint a first copy of a database with a first fingerprint, said first fingerprint having at least one part of said first fingerprint in common with another fingerprint used in at least a second copy of said database, and at least one part of said first fingerprint unique to said first copy of said database, wherein said first fingerprint caused by said at least one processor comprises a swapping of attributes between multiple records in said first copy of said database; and to perform an operation selected from the group consisting of a first operation and a second operation;

wherein said first operation comprises identifying a first record in said first copy that has a first attribute that results in a predetermined value in modulo P when hashed with a key and identifying a second record in said copy that has a second attribute that also results in said predetermined value in modulo P when hashed with a key, and then to swap said second attributes between said first and second records; and wherein said second operation comprises determining target marking records whose attributes are to be swapped and determining source marking records having attributes potentially to be used to swap with said attributes of said target marking records, wherein said software causes said processor to determine said target marking records by providing, for a given record in said first copy of said database, a concatenation of a marking key with a primary key to produce a concatenation, providing said concatenation to a random number generator, and computing a random number modulo a predetermined number.

8. The CRSM of claim 7 wherein, if said operation of the group is said second operation, said predetermined number comprises a length of a codeword, said codeword being unique to said first copy of said database.

9. The CRSM of claim 8 wherein said software causes said processor to determine said target marking records further by adding said given record to a target marking record list when a remainder of a modulo computation is a predetermined number.

10. A system, comprising:
a processor;
storage coupled to said processor, said storage containing an application that causes said processor to fingerprint a first copy of a database with a first fingerprint, said first fingerprint having parts of said first fingerprint in common with other fingerprints used in other copies of said database, and parts of said first fingerprint unique to said first copy of said database, wherein said processor fingerprints said first copy of said database with said first fingerprint by swapping attributes of multiple records in said first copy;

wherein said application causes said processor to determine target marking records whose attributes are to be swapped and determine source marking records having attributes potentially to be used to swap with said attributes of said target marking records; and wherein said application causes said processor to determine said target marking records, for a given record in said first copy of said database, by concatenating a marking key with a primary key to produce a concatenated value, providing said concatenated value to a random number generator function, and computing a random number from said function modulo a predetermined number.

11. The system of claim 10 wherein said predetermined number comprises a length of a codeword, said codeword being unique to said first copy of said database.

12. The system of claim 10 wherein said application causes said processor to determine said target marking records by adding said given record to a target marking record list when a remainder of a modulo computation is zero.

* * * * *